INVENTOR.
WILLIAM O. BRAY

BY Ronald T. Reiling

ATTORNEY

United States Patent Office 3,524,116
Patented Aug. 11, 1970

3,524,116
FLUID LEVEL CAPACITOR
William O. Bray, Minneapolis, Minn., assignor to Honeywell Inc., Minneapolis, Minn., a corporation of Delaware
Filed June 27, 1968, Ser. No. 740,744
Int. Cl. H01g 7/00
U.S. Cl. 317—246          4 Claims

ABSTRACT OF THE DISCLOSURE

A capacitor unit of three concentric tubes, two of which function as the plate of a capacitor, the third tube functioning as an electrical ground and an electrostatic shield.

BACKGROUND OF THE INVENTION

The invention is in the field of electrical capacitors, in particular capacitors for use in capacitance gauge systems such as fuel gauges where contaminants can build up on insulating surfaces between the capacitor plates and form current leakage paths between them. This leakage current may result in significant gauge error.

A good example of the prior art is U.S. Pat. 2,945,165. In this patent grounded conductors are wound on the spacers which are directly between the plates of the capacitor. It will be seen that the structure of the present invention is quite different.

Another example of the prior art is U.S. Pat. 3,103,002. In this patent a flat ground plate is inserted between the capacitor plates resulting in a capacitor somewhat like that in Pat. 2,945,165 except that the grounding element is a conductive plate rather than a wound conductor. Again it will be seen that the structure of the present invention is quite different.

SUMMARY

The invention is a capacitor unit for use in a fluid having contaminants. In an example of the invention the unit has three concentric tubes, outer, middle, and inner. Two adjacent tubes function as plates of a capacitor. The other tube functions both as a ground surface and as a shielding electrode. Each of the tubes selected as the plates of the capacitor is independently mounted on the third tube by insulative spacers so that there are no spacer surfaces directly between the active plates of the capacitor. The absence of spacer surfaces between the capacitor plates means that contaminants cannot be deposited and built up directly between the plates to form current leakage paths. Any leakage paths which form are developed from the individual plates of the capacitor to ground. Leakage current to ground can be tolerated in a capacitance gauge system to a comparatively high degree without significantly affecting system accuracy.

DESCRIPTION OF THE PREFERRED EMBODIMENT

Figure 1:
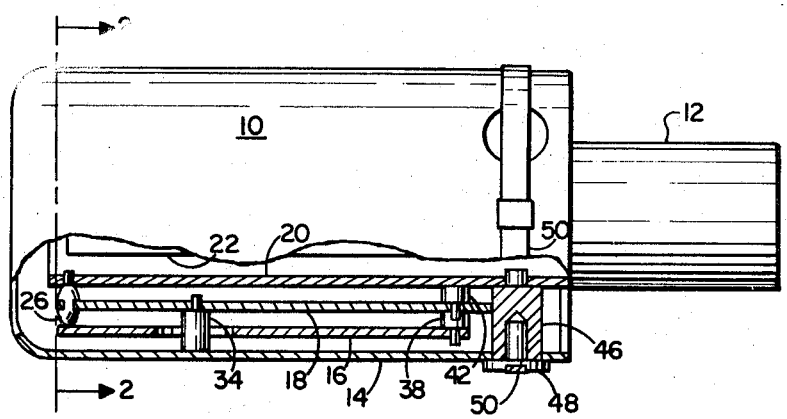
FIG. 1 shows a typical fluid tank unit on which is mounted a capacitor unit which functions as a compensator.

In FIG. 1 a compensator unit 10 is mounted on a tank unit 12 also called a fluid level probe. Compensator unit 10 includes three concentric tubes, outer tube 14, middle tube 16, and inner tube 18. Outer tube 14 and middle tube 16 function as the plates of a compensator capacitor. Inner tube 18 functions as a shield or ground plate. Although the compensator is shown mounted on tank unit 12 this is not necessary and it may be independently mounted.

Tank unit 12 includes a pair of concentric tubes, outer tube 20 and inner tube 22. They function as the plates of a capacitor used to measure the amount of a fluid in a tank (not shown).

It is well known to those experienced in the fuel gauging art to use a capacitor to measure the amount of fuel and to offset the effects of changes in the dielectric constant of the fuel which are not directly related to density with the use of a compensator capacitor. See, for example, U.S. Pat. 3,037,385. The present invention is primarily concerned with the structure of the compensator capacitor as such. Furthermore it should be noted that the present invention can be used in systems other than those related to fuel gauging. In other words, the present invention is a capacitor which can be used to advantage as such in any situation requiring the use of a capacitor and especially in a contaminated fluid or environment.

Figure 2:
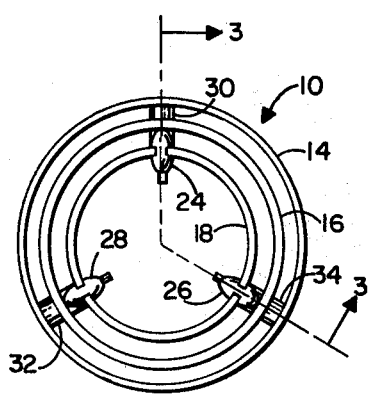
FIG. 2 is a sectional view of the capacitor unit; and,
FIG. 3 is another sectional view of the capacitor unit.

FIG. 2 is a cross section of a typical compensator unit 10 employing the basic structure described. In this particular design, equi-spaced egg shaped spacers 24, 26 and 28 are used to space inner tube 18 from middle tube 16 and lock compensator unit 10 into place on tank unit 12 (not shown in FIG. 2). Inner tube 18 has three equi-spaced slots in it. The middle portion of each spacer 24, 26 and 28 has a groove in it which coacts with the slots in tube 18. In this way, spacers 24, 26 and 28 are mounted on tube 18. The interior ends of spacers 24, 26 and 28 form short nipples which fit into holes in tube 20. In this way the compensator unit 10 is held in place on tank unit 12.

Figure 3:
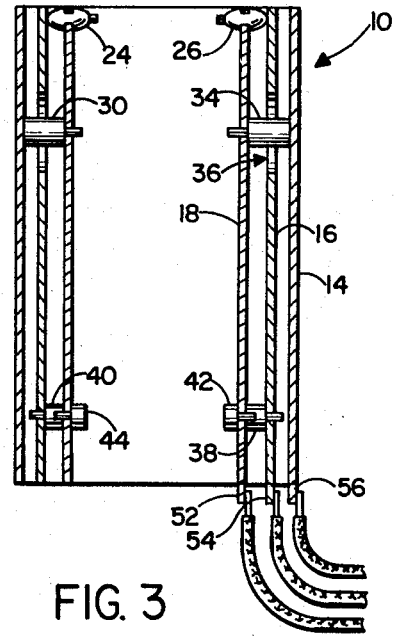

A second set of spacers 30, 32 and 34 is mounted on the outer side of inner tube 18. Nipples on the interior ends of the spacers fit into holes in tube 18. The spacers are equi-spaced about tube 18 in the same manner as spacers 24, 26 and 28. Spacers 30, 32 and 34 function to space apart inner tube 18 and outer tube 14. Spacers 30, 32 and 34 pass through relatively large holes in middle tube 16 and are spaced from it. These holes are shown in FIG. 3. For example, spacer 34 passes through a hole 36 in middle tube 16.

In FIG. 3, third and fourth sets of spacers are shown near the bottom of the compensator unit 10. The third set of spacers include three spacers, only two of which, 38 and 40, are visible in FIG. 3. Nipples at the outer ends of these spacers fit in holes in middle tube 16. The other ends of the spacers butt up against inner tube 18. The spacers are equally spaced about tube 16 in the same way as the other spacers already described, and they function to space apart middle tube 16 and inner tube 18.

The fourth set of spacers includes three spacers, only two of which, 42 and 44, are visible in FIG. 3. Nipples on the outer ends of these spacers fit through holes in inner tube 18 and into holes in the inner end of spacers 38, 40, etc. Spacers 42, 44, etc., function to hold tubes 18 and 16 in place and space inner tube 18 from outer tube 20 of tank unit 12.

Lugs 52, 54 and 56 are attached to the lower ends of tubes 18, 16 and 14 respectively and provide means for connecting electrical leads to the tubes. In use in a particular fuel gauging system, such as that shown in Pat. 3,037,385, lug 52 is connected to a reference potential, for example, ground, and isolates the middle tube 16 of unit 10 from outer tube 20 of unit 12; lug 56 is connected to a source of alternating voltage (not shown) and is commonly called the Lo–Z (low impedance) electrode; and lug 54 is connected to a current summing point and is commonly called the Hi–Z (high impedance) electrode.

A fifth set of three spacers, not shown in the simplified views of FIGS. 2 and 3 is required to position compensator unit 10 firmly in place on tank unit 12. Only one of these spacers, 46, is shown in FIG. 1; the description of it also applies to the other two spacers not shown. Spacer 46 is tightly mounted in a hole in outer tube 20 of unit 12 and passes through a hole in outer tube 14 of unit 10. A peg 48 which fits into the top of spacer 46 firmly secures tube 14 to spacer 46. A band 50 mounted in a slot on peg 48 passes around unit 10 and clamps it into position on unit 12.

It is to be understood that the arrangement which has been described is merely an illustration of the application of the principles of the invention. Other arrangements and applications may be devised by those skilled in the art without departing from the spirit and scope of the invention. For example, the unit may be formed of flat parallel plates rather than concentric tubes. The invention is not limited to compensation capacitors.

What is claimed is:

1. A capacitive element comprising:
   means defining a first conductive surface;
   means defining a second conductive surface spaced from the first, the first and second surfaces forming the plates of a capacitor;
   means defining a third conductive surface outside the space between the first and second surfaces;
   first insulating means supporting and spacing the first surface from the third surface, the first insulating means extending through openings in the second surface and spaced from the second surface;
   second insulating means supporting and spacing the second surface from the third surface, the first and second surfaces thereby being spaced from each other so that if current leakage paths are formed by contaminants on the first and second insulating means, the current leakage paths are caused to be between the first and third surfaces and the second and third surfaces respectively rather than directly between the first and second surfaces; and,
   first, second and third terminal means connected to the first, second, and third surfaces respectively, the first terminal means for supplying an electrical potential to the first surface, the second terminal means for connecting the second surface to a point in a system with which the capacitive element is associated, and the third terminal means for supplying a reference potential to the third surface.

2. The apparatus of claim 1 wherein the means defining the three conductive surfaces are three concentric tubes, inner, middle, and outer, the first and second surfaces being adjacent to each other.

3. The apparatus of claim 2 wherein the outer and middle tubes function as the plates of the capacitor and the inner tube functions as a ground surface and shield.

4. The apparatus of claim 1 in combination with a fluid level probe, the probe including a pair of concentric tubes functioning as a capacitor, the capacity of the capacitor being a function of the fluid level, the apparatus of claim 1 mounted on the probe and concentric with it.

References Cited

UNITED STATES PATENTS 2,800,628   7/1957   Stinson _____ 317—246 X

ELLIOT A. GOLDBERG, Primary Examiner

U.S. Cl. X.R.

317—256